United States Patent [19]

Filipovich

[11] Patent Number: 5,079,416
[45] Date of Patent: Jan. 7, 1992

[54] COMPACT SEE-THROUGH NIGHT VISION GOGGLES

[75] Inventor: Danny Filipovich, Lincolnwood, Ill.

[73] Assignee: Night Vision General Partnership, Chicago, Ill.

[21] Appl. No.: 499,326

[22] PCT Filed: Oct. 26, 1988

[86] PCT No.: PCT/US88/03779
§ 371 Date: Apr. 26, 1990
§ 102(e) Date: Apr. 26, 1990

[87] PCT Pub. No.: WO89/04008
PCT Pub. Date: May 5, 1989

[51] Int. Cl.⁵ .............................. H01J 31/50
[52] U.S. Cl. .................. 250/213 V T; 313/523
[58] Field of Search ........ 250/213 V T, 213 R; 313/523

[56] References Cited

U.S. PATENT DOCUMENTS

| | | | |
|---|---|---|---|
| 2,685,230 | 8/1954 | Baker | 88/57 |
| 2,710,560 | 6/1955 | Thompson . | |
| 3,152,214 | 10/1964 | Korones et al. | 88/57 |
| 3,257,904 | 6/1966 | Scidmore et al. | 88/72 |
| 3,394,975 | 7/1968 | Coniglio | 350/2 |
| 3,409,343 | 11/1968 | Zapp | 350/51 |
| 3,443,105 | 5/1969 | Scidmore et al. | 250/213 |
| 3,450,480 | 4/1965 | Chitayat | 356/163 |
| 3,454,322 | 7/1969 | Scidmore et al. | 350/55 |
| 3,454,773 | 7/1969 | Bulthuis et al. | 250/213 |
| 3,464,757 | 9/1969 | Schmidt et al. | 350/1 |
| 3,500,048 | 3/1970 | Menke | 250/83.3 |
| 3,509,344 | 4/1970 | Bouwers | 250/83.3 |
| 3,529,882 | 9/1970 | Schmidt | 350/2 |
| 3,781,560 | 12/1973 | DeBurgh et al. | 250/333 |
| 3,787,688 | 1/1974 | Stone | 250/213 V T |
| 3,907,401 | 9/1975 | Liu | 350/2 |
| 3,915,547 | 10/1975 | Scidmore et al. | 350/2 |
| 3,977,855 | 8/1976 | Cole | 65/4 B |
| 4,000,419 | 12/1976 | Crost et al. | 250/213 V T |
| 4,028,544 | 6/1977 | Jourdan et al. | 250/203 R |
| 4,037,921 | 7/1977 | Cos | 350/36 |
| 4,076,978 | 2/1978 | Brennan et al. | 250/213 V T |
| 4,124,798 | 11/1978 | Thompson | 250/213 VT |
| 4,145,142 | 3/1979 | Mikeman | 356/229 |
| 4,154,502 | 5/1979 | Siegmund | 350/96.26 |

(List continued on next page.)

FOREIGN PATENT DOCUMENTS

| | | |
|---|---|---|
| 0025398 | 3/1981 | European Pat. Off. . |
| 0029005 | 6/1981 | European Pat. Off. . |
| 0066402 | 12/1982 | European Pat. Off. . |
| 1128678 | 7/1962 | Fed. Rep. of Germany . |
| 1294059 | 9/1969 | Fed. Rep. of Germany . |
| 1463509 | 12/1966 | France . |
| 1480611 | 4/1967 | France . |
| WO86/05281 | 9/1986 | PCT Int'l Appl. . |
| WO87/00639 | 1/1987 | PCT Int'l Appl. . |
| 913894 | 12/1962 | United Kingdom . |
| 1010126 | 11/1965 | United Kingdom . |
| 2006463 | 5/1979 | United Kingdom . |

*Primary Examiner*—David C. Nelms
*Assistant Examiner*—T. Davenport
*Attorney, Agent, or Firm*—Willian Brinks Olds Hofer Gilson & Lione

[57] ABSTRACT

Compact night vision goggles apparatus (400, 500, 600) which provide the user with both a direct or unintensified image and an intensified image via first and second intersecting optical paths. The apparatus includes secondary image input means (490, 690) for incorporating symbology or other secondary images into the intensified optical path to be presented to the user along with the intensified and unintensified images. In addition, the apparatus includes peripheral imaging means (540) for providing the user with a large peripheral field of view notwithstanding obstructions on the apparatus which would normally interfere with the user's peripheral vision. The apparatus includes first and second goggle housings (422, 423, 522, 523, 622, 623) for the two eyes of the user, and, according to one embodiment, also includes optical means (497) in the bridge (424) of the goggles (400) for transmitting the intensified image from one housing (422) to the other (423) such that the intensified image from one image intensifying means (460) is presented to both eyes of the user.

36 Claims, 7 Drawing Sheets

U.S. PATENT DOCUMENTS

| | | | |
|---|---|---|---|
| 4,178,075 | 12/1979 | Rogers | 350/175 FS |
| 4,183,482 | 1/1980 | Jozwiak | 244/3.16 |
| 4,196,969 | 4/1980 | Itoh | 350/184 |
| 4,205,894 | 6/1980 | Filipovich et al. | 350/35 |
| 4,232,222 | 11/1980 | Deltrap | 250/333 |
| 4,266,129 | 5/1981 | Versteeg et al. | 250/330 |
| 4,266,848 | 5/1981 | Schlegel | 350/8 |
| 4,361,378 | 11/1982 | Freeman | 350/36 |
| 4,376,889 | 3/1983 | Swift | 250/213 V T |
| 4,463,252 | 7/1984 | Brennan et al. | 250/213 V T |
| 4,467,190 | 8/1984 | Hadani | 250/213 V T |
| 4,468,101 | 8/1984 | Ellis | 350/538 |
| 4,483,587 | 11/1984 | Michon et al. | 350/174 |
| 4,563,061 | 1/1986 | Ellis | 350/503 |
| 4,572,625 | 2/1986 | Arndt et al. | 350/541 |
| 4,576,432 | 3/1986 | Ruger | 350/1.2 |
| 4,653,879 | 3/1987 | Filipovich | 350/538 |
| 4,655,562 | 4/1987 | Kreitzer et al. | 350/538 |
| 4,660,943 | 4/1987 | Ellis | 350/538 |
| 4,775,217 | 10/1988 | Ellis | 350/538 |
| 4,792,673 | 12/1988 | Blackler | 250/213 V T |
| 4,961,278 | 10/1990 | Johnson et al. | 250/213 V T |

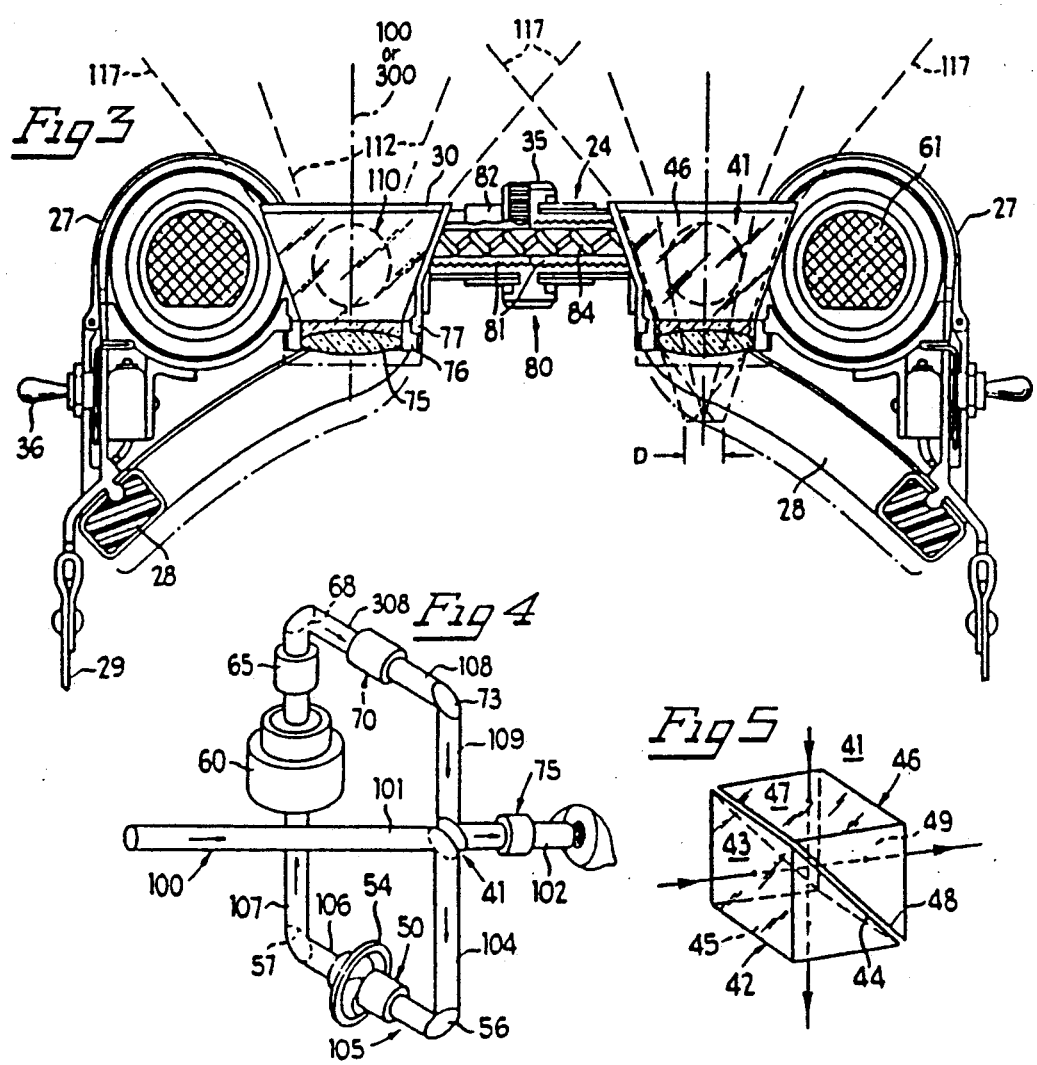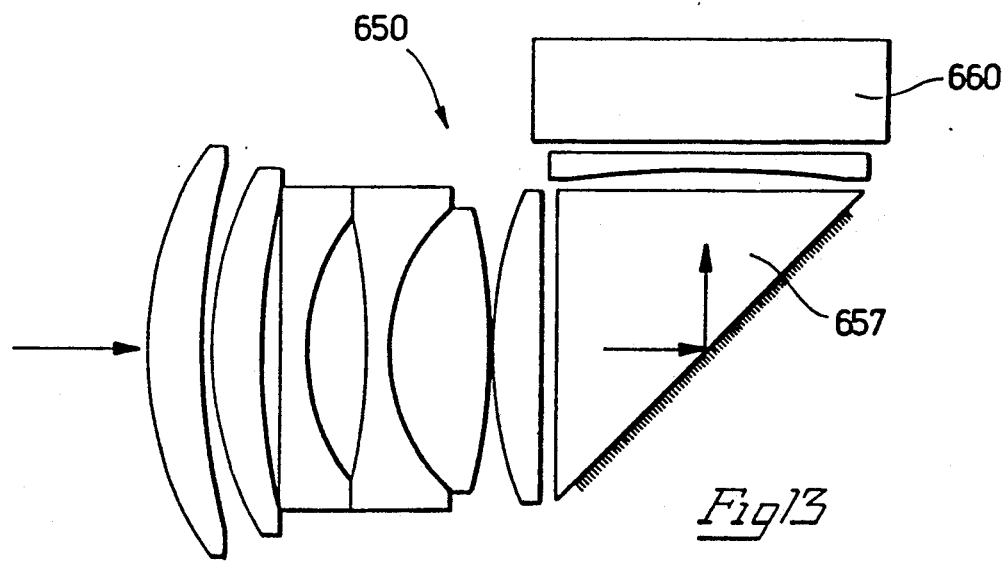

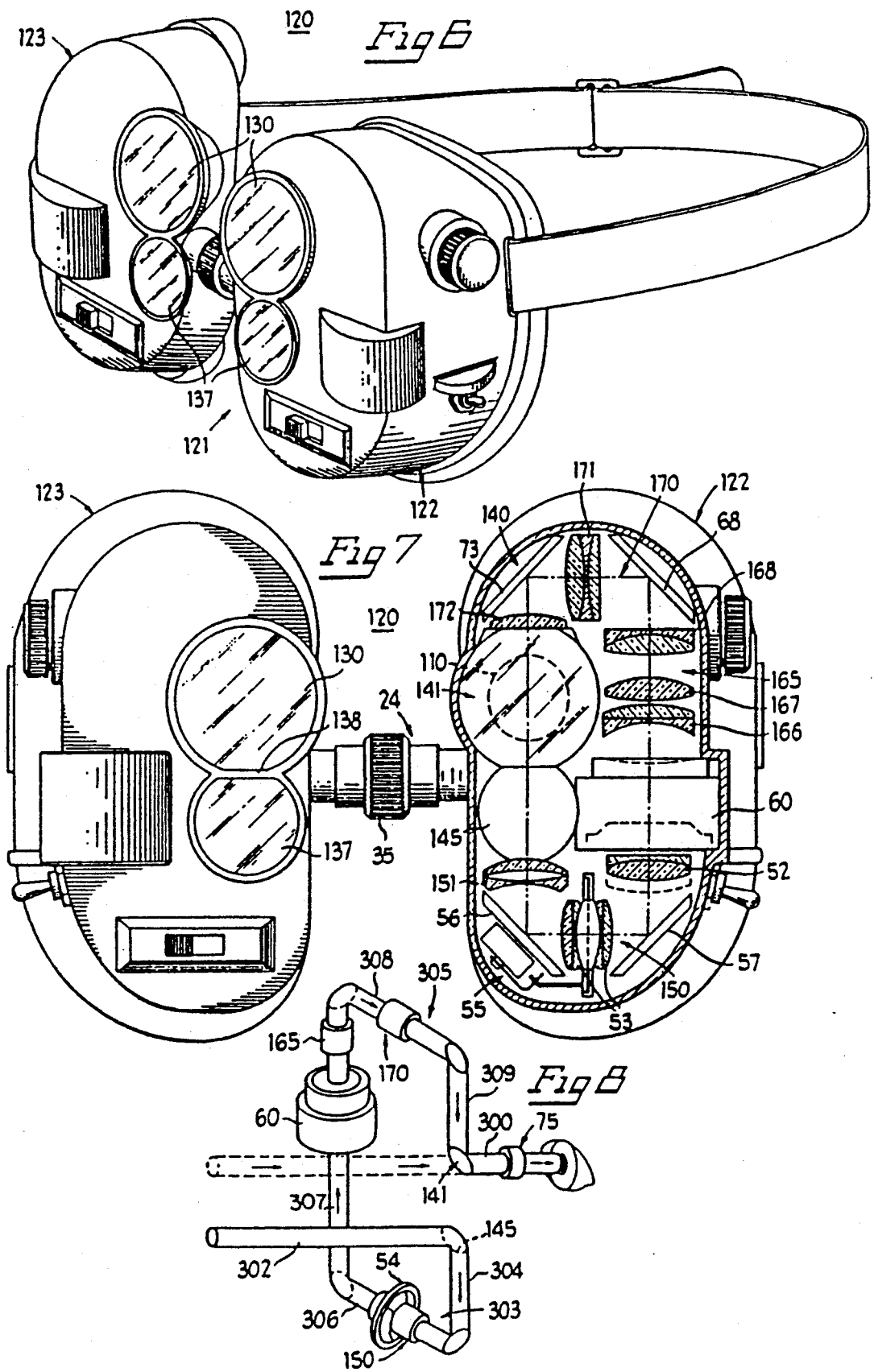

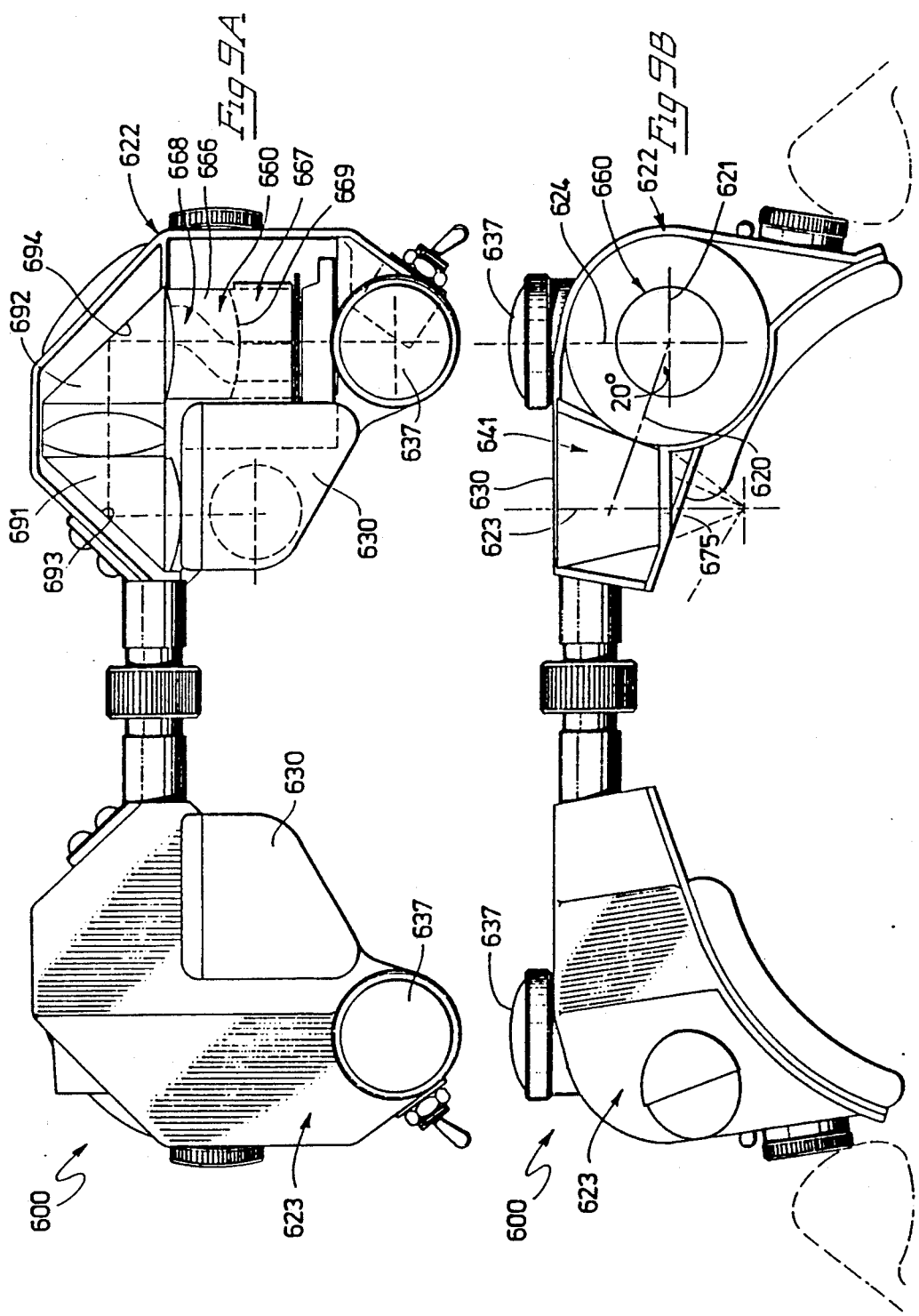

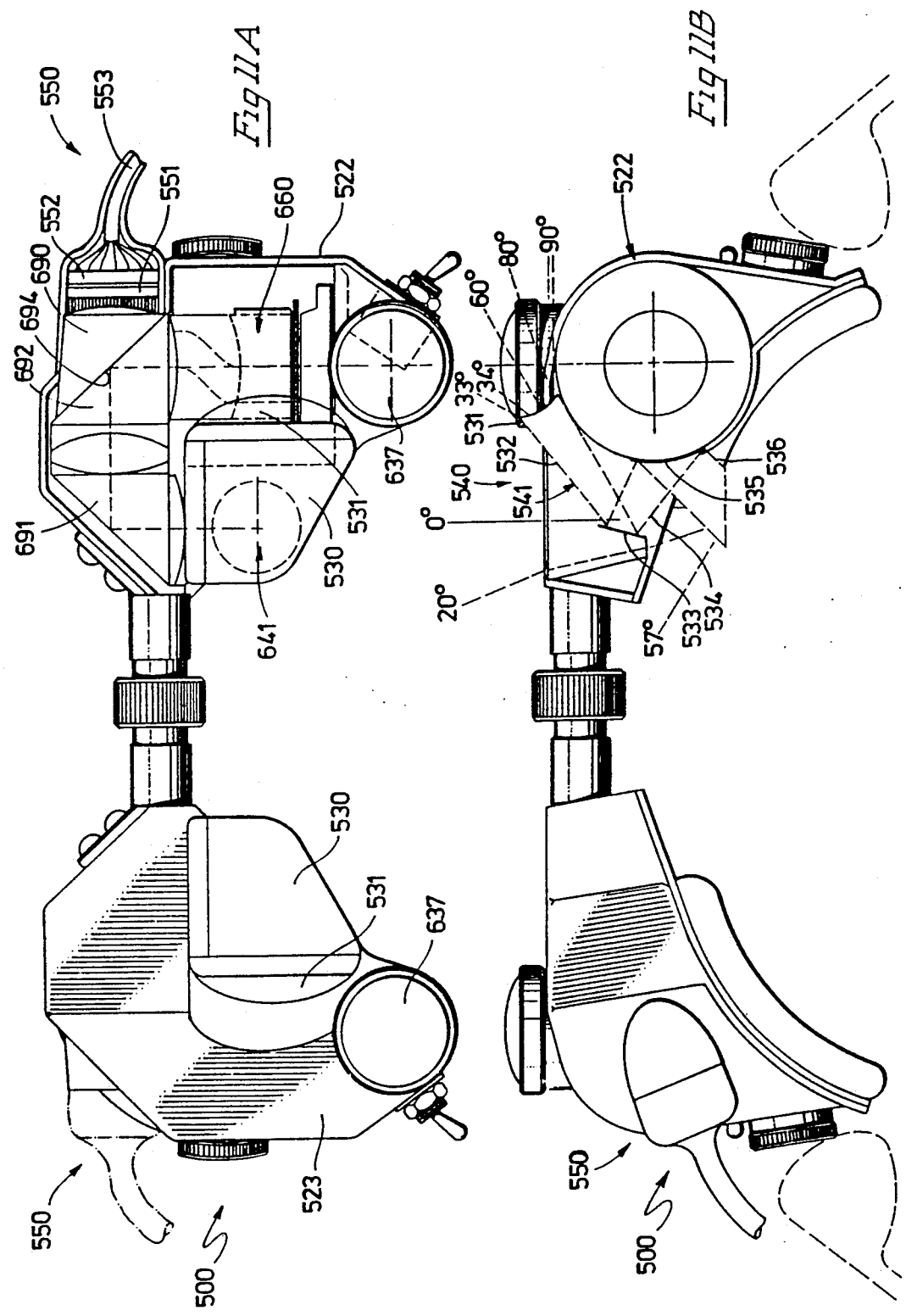

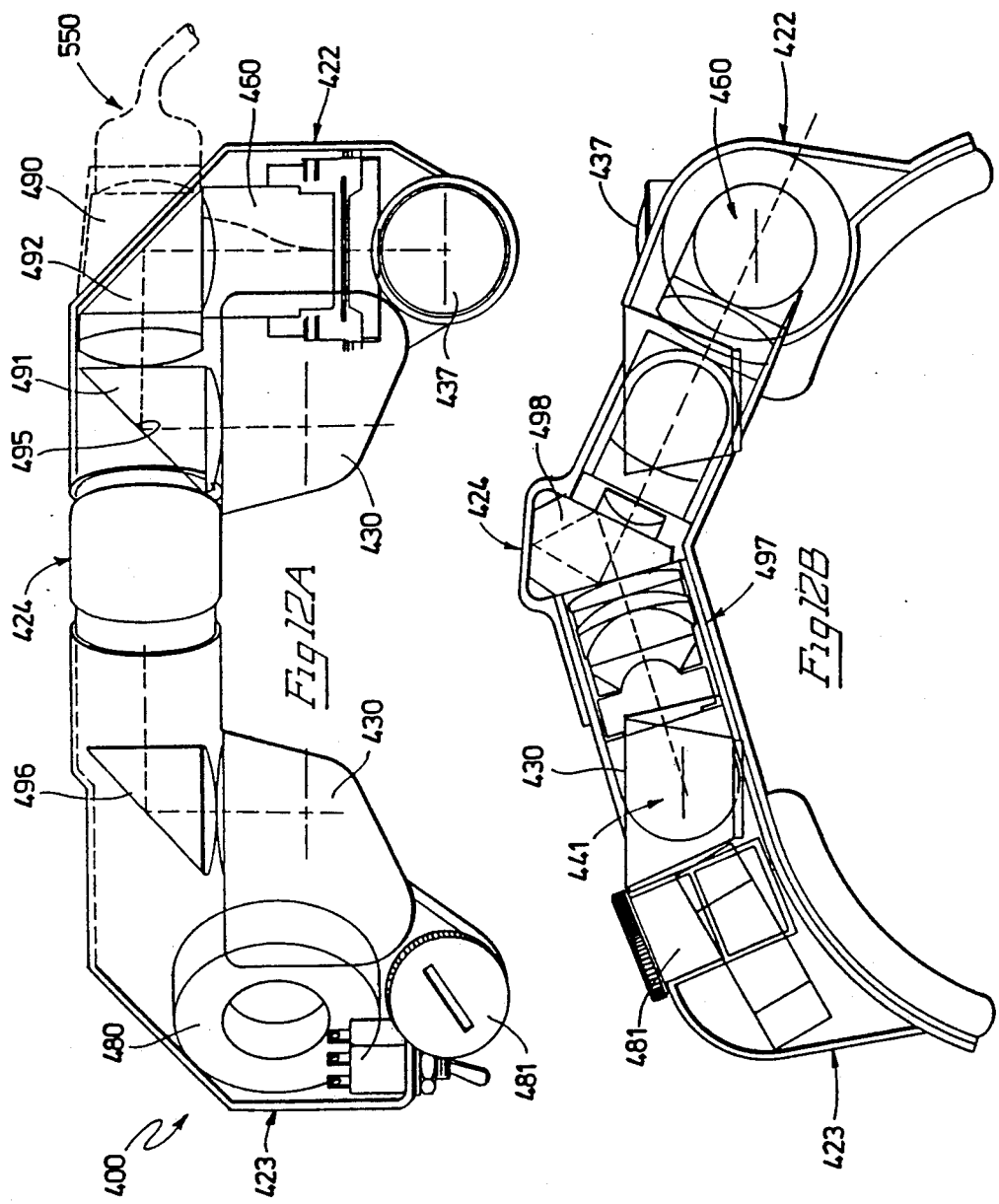

COMPACT SEE-THROUGH NIGHT VISION GOGGLES

TECHNICAL FIELD

The present invention relates generally to night vision systems of the type which permit vision under very low light conditions by intensifying incoming infrared and/or visible light from a viewed object and converting the incoming light to an intensified visible light. More particularly, the invention relates to compact night vision goggle systems which provide the user with both an intensified image and a direct or unintensified image; and which, in addition, are designed to closely conform to the shape of the user's face, are capable of presenting indicia or other secondary images, and are effective in providing a large peripheral field of view.

BACKGROUND ART

Existing night vision goggle systems are typically heavy, cumbersome and unstable. They do not even resemble common goggles; but, rather, resemble television cameras mounted on the user's head. Such goggles typically protrude more than 175 mm from the user's eyes and weight as much as 850 grams, and the weight and front-to-back length of such systems exert large moments on the user's head, causing serious instability problems and preventing their effective use in applications in which the user's head is subjected to high gravitational or centrifugal loads.

Night vision goggle systems typically include an objective lens set, an image intensifier and an eyepiece lens set, all arranged in a straight line. The lens design frequently results in an inverted image at the user's eyes. Correction of this condition by the addition of an inverting lens set would only add to the already excessive length of the system and further aggravate the instability problem. Accordingly, the inverted image condition is often corrected by the use of twisted fiber optics in the image intensifier. Twisted fiber optics, however, can also increase the length of the optical system, and can cause distortion in the image presented to the user.

Many existing night vision goggles also cannot handle sudden excessive lighting conditions such as flares or other bright lights. In such conditions, the goggles become inoperative and the image intensifier must be turned off. When the image intensifier is turned off, however, most prior systems become opaque, rendering the user essentially blind.

It is known to provide night vision goggles wherein the main optical assembly is coupled to the user's eye through a periscope-type arrangement, the reflection to the user's eye being provided by a beam splitting prism which is transparent when the system is turned off, permitting the user to look past the main optical assembly. Such arrangements, however, still suffer from many of the disadvantages discussed herein.

Furthermore, prior night vision goggle systems generally have an extremely limited field of view and provide little or no peripheral vision. This renders such systems essentially useless in applications which require peripheral vision, for example, in applications in which the user is operating an automobile, aircraft or other vehicle, and must be able to view an instrument panel or the like without significant head movement.

An improved night vision goggle system which overcomes many of the above limitations of prior night vision goggles is disclosed in U.S. Pat. No. 4,653,879 issued on Mar. 31, 1987. The goggles disclosed in this patent are compact, light in weight, provide the user with both an intensified image and an unintensified or direct image, and are operable in sudden excessive lighting conditions. The resulting goggles can also be effectively used by pilots of high performance aircraft and in other applications where the user's head is likely to be subjected to high gravitational forces or similar loads without causing the instability problems discussed above.

It would be desirable to provide an improved night vision goggle apparatus which incorporates the advantageous features of the goggles described in U.S. Pat. No. 4,653,879; and which, in addition, is of even greater compactness so as to permit the user to also wear an oxygen mask, helmet and/or other conventional equipment, as is often required by pilots of high performance aircraft and others, without interference from the goggles.

It would also be desirable to provide night vision goggles which are capable of providing indicia or other types of secondary images to the user without interfering with the normal use of the goggles. In this regard, modern avionics suites in high performance aircraft typically include numerous information presentation devices to apprise the pilot of aircraft performance and attitude, and to provide other information such as topographical, enhanced scene, or radar data. A modern avionics suite may include, for example, forward looking infrared (FLIR) imaging devices, stabilized telephoto and low-light television imaging devices and radar for imaging and/or thread identification and tracking. A pilot may rely upon the data displayed by one or more of these devices during operation of the aircraft. Similarly, heads up displays (HUDs) of attitude, performance and navigation information are common. Receiving or monitoring such data or information may be vital to the pilot during operation of the aircraft, and it is desirable that the pilot to be able to easily view such secondary indicia or images without having to remove the goggles and in a manner that won't interfere with normal use of the goggles.

It would also be desirable to provide night vision goggles which afford the user with a large field of view; and, in particular, with a peripheral field of view which approaches that enjoyed by persons not wearing goggles.

DISCLOSURE OF INVENTION

It is a general object of the present invention to provide an improved night vision goggle apparatus which avoids the disadvantages of prior night vision systems while affording the user with additional structural and operational advantages.

A specific object of the present invention is to provide a compact image-intensifying night vision goggle apparatus having relatively low mass and short front-to-back dimensions. A related object is to provide a night vision goggle apparatus which is designed to permit the goggles to closely conform to the shape of the user's face thus providing the goggles with reduced weight and a shorter extension, and permitting the user to also wear a conventional oxygen mask, helmet or other equipment without interference from the goggles.

A further object of the invention is to provide compact, image-intensifying night vision goggle apparatus which presents a substantially non-distorted intensified image to the user notwithstanding the incorporation of twisted fiber optics in the intensified image path.

Yet a further object of the invention is to provide an image-intensifying night vision apparatus which is capable of displaying indicia or other secondary images to the user which are superimposed upon the direct and/or intensified images in such a manner that the apparatus may be worn substantially full time, and does not require the user to divert his attention to an external display screen or other information presentation device in order to view the secondary information. A related specific object is to provide compact night vision goggles for aircraft pilots or others that emulates or exceeds present capabilities of HUD displays in a full range of operational conditions, where the display indicia is presented directly to the pilot.

Still a further object of the invention is to provide a night vision goggle apparatus in which an intensified image from a single image intensifier is provided to both eyes of the user through an optical system in the bridge of the goggles to permit an even further reduction in the size of the goggles, and more efficient use of the space within the goggles.

Another object of the invention is to provide an image-intensifying night vision goggle apparatus which is designed to provide the user with a peripheral field of view of 160° or more notwithstanding the presence of protuberances or other obstructions on the goggles or on other equipment worn by the user that would normally interfere with peripheral vision.

The following description sets forth presently preferred embodiments of the invention which consists of certain novel features and a combination of parts hereinafter fully described, illustrated in the accompanying drawings and particularly pointed out in the appended claims. It is understood, however, that various changes in the details may be made by those skilled in the art without departing from the spirit and without sacrificing any of the advantages of the present invention.

BRIEF DESCRIPTION OF THE DRAWINGS

FIG. 3 is a horizontal sectional view of the goggles of FIGS. 1 and 2;

FIG. 4 is a diagrammatic view of the optical assembly and paths therethrough in the right-hand portion of the goggles of FIGS. 1-3;

FIG. 5 is a schematic perspective view of the dichroic separating/combining prism set of the goggles of FIGS. 1-3;

FIG. 6 is a perspective view of a second embodiment of night vision goggles as are disclosed in U.S. Pat. No. 4,653,879;

FIG. 7 is a front elevational view of the goggles of FIG. 6;

FIG. 8 is a diagrammatic view of the optical assembly and paths therethrough in the right-hand portion of the goggles of FIGS. 6 and 7;

FIG. 9A is a front elevational view, in partial vertical section, of night vision goggles according to one embodiment of the present invention;

FIG. 9B is a top view, in partial horizontal section, of the goggles of FIG. 9A;

FIG. 11A is a front elevational view, in partial vertical section, of night vision goggles according to a second embodiment of the present invention;

FIG. 11B is a top view, in partial horizontal section, of the goggles of FIG. 11A;

FIG. 12A is a front view, in partial vertical section, of night vision goggles according to a third embodiment of the present invention;

FIG. 12B is a top view, in horizontal section, of the goggles of FIG. 12A; and

FIG. 13 schematically illustrates an objective optics set which may be used in the goggles of the present invention.

BEST MODES FOR CARRYING OUT THE INVENTION

FIGS. 1-8 illustrate embodiments of night vision goggles disclosed in prior U.S. Pat. No. 4,653,879; and are included herein to assist in providing a clear understanding of the present invention.

Figure 1:
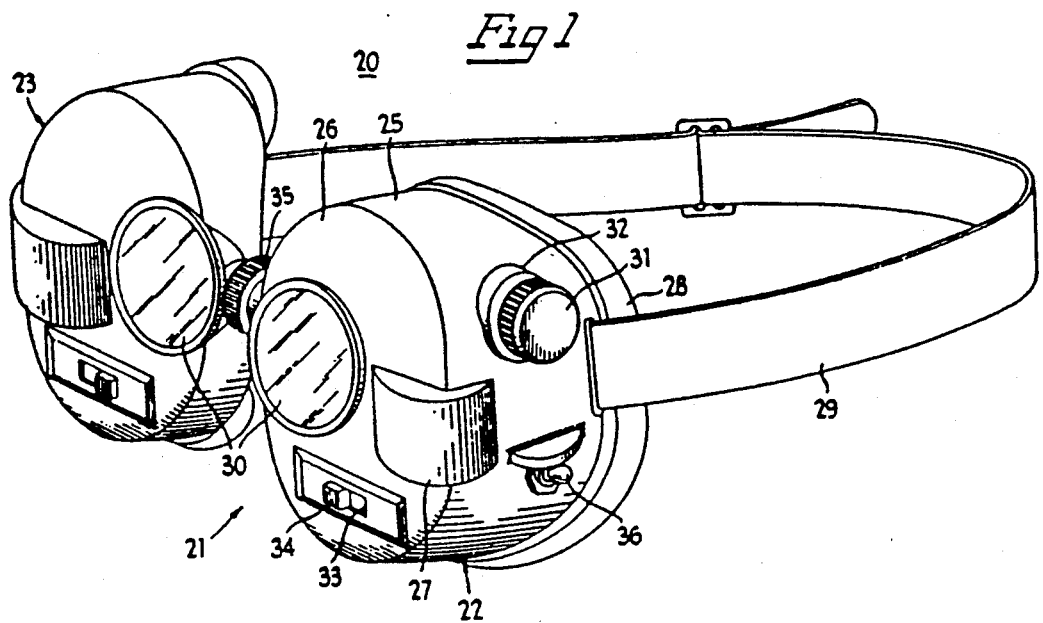
FIG. 1 is a perspective view of a first embodiment of night vision goggles as are disclosed in U.S. Pat. No. 4,653,879 to assist in providing a clear understanding of the present invention.
Figure 2:
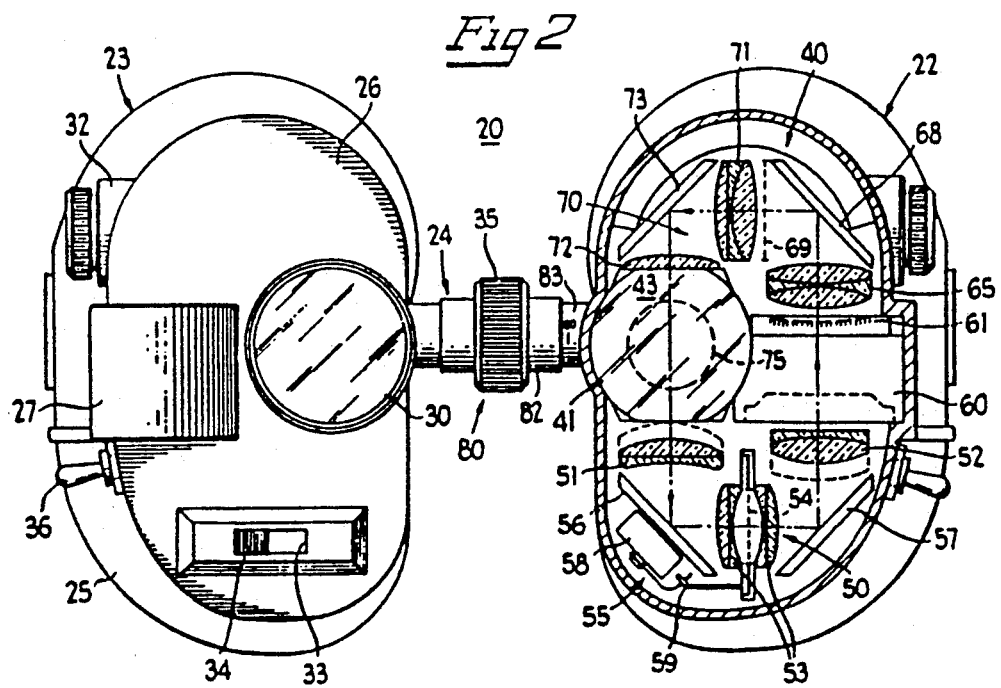
FIG. 2 is a front elevational view in partial vertical section of the goggles of FIG. 1.

FIGS. 1-3 illustrate a first embodiment of a pair of night vision goggles, generally designated by reference numeral 20. Goggles 20 include a housing assembly 21 which comprises a pair of housings 22 and 23 arranged for covering the left and right eyes, respectively, of the user and interconnected by a bridge 24. Housings 22 and 23 are constructed as mirror images of each other, and each includes an encompassing peripheral side wall 25 closed at the front end thereof by a flat planar front wall 26. A part-cylindrical portion 27 projects forwardly and laterally outwardly from the housing generally centrally of the junction between the outer side edge of the front wall 26 and the peripheral side wall 25. The rear edge of the peripheral side wall 25 is provided with a face cushion 28 of suitable resilient material, such as a foam rubber or the like. The face cushion 28 extends around substantially the entire perimeter of the side wall 25 except for the inner side edge thereof adjacent to the user's nose. The rear ends of the housings 22 and 23 are interconnected by a head strap 29 for mounting the goggles 20 on the user's head in standard fashion, with the housings 22 and 23 covering the user's left and right eyes, respectively.

Each of the housings 22 and 23 also has a circular input window 30 in the front wall 26 thereof adjacent to the inner side edge thereof, the window 30 being formed of a suitable transparent material such as glass or plastic. A battery cartridge 31 is mounted in a battery receptacle boss 32 on the outer side of the peripheral side wall 25. A rectangular slot 33 is formed in front wall 26 adjacent to the lower end thereof and slidably receives a focusing knob 34 for providing continuous focusing of certain optical components of the goggles 20, as will be explained more fully below. Bridge 24 carries a knurled control wheel 35, the function of which will also be explained below, and a power switch 36 is mounted on peripheral side wall 25 for selectively connecting and disconnecting the battery cartridge 31 from an optical assembly 40 mounted within the housing 22 or 23.

With particular reference to FIGS. 2, 3 and 5, each housing 22 and 23 contains an optical assembly 40. The two assemblies 40 are arranged as mirror images of each other, the optical assembly 40 for the left eye housing 22 being illustrated in FIG. 2. Optical assembly 40 includes a separating/combining prism set 41, which is diagrammatically illustrated in FIG. 5. Prism set 41 includes a separating prism 42 and a combining prism 46, each being of the dichroic beam splitting type. More specifically, the separating prism 42 includes an input surface 43, a separating surface 44 and an output surface 45, whereas the combining prism 46 includes an input surface 47, a combining surface 48 and an output surface 49.

Prisms 42 and 46 are arranged so that the separating and combining surfaces 44 and 48 are disposed in facing parallel relationship with a predetermined small gap therebetween to avoid interference with visible light transmission. In this configuration, the input surface 43 of prism 42 is arranged parallel to the output surface 49 of prism 46, while the input surface 48 of prism 42 is arranged parallel to the output surface 45 of prism 46. While, for clarity of illustration, the prisms 42 and 46 have been diagrammatically illustrated with rectangular surfaces in FIG. 5, in practice, prism set 41 has a somewhat conical configuration, with the input surface 43 and the output surface 49 being substantially circular in shape, and the input surface 47 being generally trapezoidal in shape, as indicated in FIGS. 2 and 3, with the input surface 43 disposed immediately behind the window 30.

In practice, incoming visible and infrared light from a viewed object enters the prism set 41 through the input surface 43 of separating prism 42 and travels through prism 42 to separating surface 44. A portion of the light impinging on surface 44 is transmitted to the combining prism 46 and out of prism set 41 through output surface 49. The remainder of the light is reflected from surface 44 and out of prism set 41 through output surface 45. In like manner, when light enters the input surface 47 of combining prism 46, the light will strike combining surface 48, and a portion will be transmitted to prism 42 and out of prism set 41 through the output surface 45, while another portion will be reflected out of the prism set through output surface 49.

Optical assembly 40 also includes an objective lens set 50 of separated groups, including lens groups 51 and 52 and a pair of lens groups 53 separated by an iris 54 of an automatic light control assembly 55. A mirror 56 is disposed between lens group 51 and one of the lens groups 53, while another mirror 57 is disposed between the other lens group 53 and lens group 52, so that the optical path is in the direction indicated by the arrows in FIG. 2. The automatic light control assembly 55 includes a motor 58 electrically connected to the battery cartridge 31 and mechanically connected by a linkage 59 to the iris 54. The motor 58 is also electrically connected to an image intensifier 60 which is mounted adjacent to the lens group 52. The image intensifier 60 is of standard construction, and includes circuitry for sensing the intensity of the light passing therethrough and providing to the motor 58 a feedback signal proportional to such intensity. For intensities above a predetermined level, the motor 58 will be actuated to close iris 54 by an amount sufficient to reduce the light passing therethrough to an acceptable level.

The image intensifier 60 is preferably an 18 mm Microchannel wafer-type image intensifier, with a straight fiber optics output window 61. In operation, the image intensifier 60 receives incoming visible and infrared light from the objective lens set 50 and intensifies it, conveying it to a visible output light in a predetermined narrow band of wave lengths. In a preferred embodiment, the output light from the image intensifier 60 is emitted by a green phosphor, producing a visible band of light which is known as "P-20" light, although it will be appreciated that image intensifiers producing other output wave lengths could also be used.

The output from image intensifier 60 is applied to a relay lens group 65, producing a secondary image which is reflected from a mirror 68 to an image plane 69. This image then passes through an eyepiece lens set 70, which includes a lens group 71 and a plano convex lens 72, a mirror 73 being interposed therebetween. The output of the eyepiece lens set 70 then passes into combining prism 46 of prism set 41 through input surface 47 thereof.

Optical assembly 40 also includes a diopter adjusting lens 75 (FIG. 3) which is preferably a lens group and is carried in a circular holder 76, which is threadedly engaged in the rear end of a generally conical housing receptacle 77 in the housing 22 (or 23). The diopter adjusting lens 75 is, therefore, disposed immediately adjacent to the output surface 49 of the combining prism 46, and may readily be replaced with other adjusting lenses, depending upon the diopter requirement of the particular user's eye.

Bridge 24 carries an interpupillary adjustment assembly 80 which includes a pair of coaxial, externally threaded inner tubes 81 connected to housings 22 and 23, respectively, and an internally threaded outer tube 82 which is threadedly engaged with each of the inner tubes 81 and is encircled by and fixedly secured to the knurled control wheel 35. Preferably, a micrometer scale 83 is imprinted on the outer surface of one or both of the inner tubes 81 to indicate the interpupillary distance between the optical assemblies 40.

Disposed within the inner tubes 81 is a helically wound electrical wire 84 which powers both housings 22 and 23 from one electrical switch 36. By rotating the outer tube 82 by use of the knurled wheel 35, the inner tubes 81 are moved axially toward and away from each other to vary the interpupillary distance to match that of the particular user who will be wearing the goggles 20.

As disclosed in U.S. Pat. No. 4,653,879, the reflectance characteristics of the coating on separating surface 44 of prism 42 are preferably selected to reflect approximately 50% of the wave lengths in the visible spectrum, between about 400 and 700 nm, while transmitting the remainder of the incident visible light. In addition, the coating is selected so that between 90% and 100% of the incident infrared light, i.e., light at wave lengths about 700 nm, is reflected by surface 44, depending upon the quality of the dichroic coating thereon. Any unreflected infrared light is, of course, transmitted through the separating surface 44.

The reflectance characteristics of the coating on combining surface 48 are chosen to reflect a narrow band of wave lengths, less than 100 nm centered at 550 nm, which is the wave length of the P-20 light emitted from the image intensifier 60. Between 75% and 100% of this P-20 light will be reflected, depending upon the quality of the dichroic coating on the combining surface 48. Wave lengths below 500 nm and above 600 nm are substantially completely transmitted through the combining surface. However, since only P-20 light is emitted from image intensifier 60, only P-20 light enters input surface 47 of prism 46, substantially all of this light being reflected out through the output surface 49. In order to prevent the small portion of P-20 light that is transmitted through combining surface 48 from entering the objective lens set 50, a pair of polarizing filters (not shown) could be applied, respectively, on input surface 47 and output surface 45.

The approximately 50% of the visible light transmitted through the separating surface 44 will suffer some additional loss in passing through the combining surface 48. This loss can be minimized by the use of a holographically formed coating on the combining surface 48 by techniques known to those skilled in the art.

Referring in particular to FIGS. 2, 3 and 4, the operation of optical assembly 40 will now be explained in detail. FIG. 4 is a diagrammatic representation of optical assembly 40 and the light paths therethrough in right eye housing 23, but it will be appreciated that the corresponding diagram for the optical assembly 40 in left eye housing 22 would simply be a mirror image. The entire spectrum of light from the viewed object, including visible and infrared light, enters optical assembly 40 at an entrance plane defined by the window 30. This light enters along a see-through path 100 having a front portion 101 forward of prism set 41 and a rear portion 102 rearward of prism set 41. It can be seen that the see-through path 100 is a straight-line path along the viewing axis of the user's eye, which lies along the line of sight from the user's eye to the viewed object.

When this light strikes separating surface 44 of separating prism 42, approximately 50% of the visible light and virtually all of the infrared light is reflected downwardly along a vertical leg 104 of a folded intensified light path 105, which defines a loop lying in a plane substantially perpendicular to the see-through path 100. The reflected light in the folded path 105 is reflected by mirror 56 along a horizontal leg 106 and then by mirror 57 along a vertical leg 107, in the direction indicated by the arrow in FIG. 4. The objective lens set 50 is, for convenience, diagrammatically illustrated in leg 106 although, as can be seen from FIG. 2, the objective lens set 50 actually includes separated lens groups which are disposed on either side of mirrors 56 and 57.

The light that is reflected into leg 107 passes through image intensifier 60 and is converted to an intensified P-20 light, which then passes through relay lens group 65. The output from relay lens group 65 passes through eyepiece lens set 70 to the input surface 47 of combining prism 46, being reflected en route by mirror 68 into a horizontal leg 108 and thence by mirror 73 to a descending leg 109 of the path 108. While, for convenience, the eyepiece lens set 70 is diagrammatically illustrated in leg 108, it will be understood that it comprises separated elements which are disposed on either side of mirror 73.

When the P-20 light arrives at combining surface 48 of prism 46, it is substantially all reflected into the rear portion 102 of the see-through path 100 through output surface 49, combining with the approximately 50% of the visible light which was transmitted through the separating prism 42. This combined light is then passed through the diopter adjustment lens 75 to the viewer's eye.

The purpose of relay lens group 65 is to invert the image from the image intensifier 60 to complement an inversion effected by objective lens set 50, thereby insuring that an erect image will be presented to the viewer's eye. Alternatively, twisted fiber optics could be used in image intensifier 60 to effect the necessary image inversion.

As disclosed in U.S. Pat. No. 4,653,879, the unique arrangement of the optical assemblies 40 results in night vision goggles having significantly reduced front-to-back dimensions. This is because most of the optical components in each optical assembly 40 are arranged in the folded path 105 which lies in a plane disposed perpendicular to the viewing axis. The only optical components disposed along the viewing axis are the separating/combining prism set 41 and the diopter adjusting lens 75. This results in a goggle housing assembly 21 which has a total front-to-back depth of only about 70 mm as opposed to prior art devices which have depths in excess of 175 mm. Additionally, the total weight of the goggles 20 is only about 350 grams, as opposed to weights of between 650 and 850 grams for prior night vision goggles. The significantly reduced mass and depth of the goggles results in a reduced moment relative to the user's eye of about 730 g/cm, as compared with moments of about 6000 g/cm for prior goggles. Goggles 20 thus provide greatly enhanced stability in use.

As further pointed out in U.S. Pat. No. 4,653,879, goggles 20 also provide a see-through capability in that beam splitting prisms 42 and 46, being in the see-through path 100 along the viewing axis and being at least 50% transparent to visible light, permits a viewer to see direct or unintensified light through the goggles even when the image intensifiers are turned off. Accordingly, the user can turn on the image intensifiers 60 only when they are needed, thereby reducing power consumption and battery drain.

Goggles 20 are also designed so that the direct or see-through field of view is significantly greater than the intensified field of view, thereby affording the viewer significant unintensified peripheral vision, even when the image intensifiers 60 are turned on. As pointed out in U.S. Pat. No. 4,653,879, the size of the output area of the image intensifier 60 (about 18 mm) and the focal length of the eyepiece lens set 70 are such that there is formed on the input surface 47 of the combining prism 46 an intensified image area 110 (FIG. 3). This affords a circularly conical intensified image field of view of substantially 45° defined by substantially conical-shaped boundary 112 which is substantially coaxial with the viewing axis along the see-through path 100. This is comparable to the intensified field of view angle afforded by prior night vision goggles.

However, prism set 41 is designed with external dimensions such as to provide a see-through image field of view which is substantially greater than the intensified image field of view. More particularly, the see-through image field of view is coaxial with the intensified image field of view and has a circularly conical outer boundary 117 with a conical angle of at least 80°, and preferably 90° such that the see-through image field of view is approximately twice that of the intensified image field of view, affording see-through vision extending 45° above and below the viewing axis.

It will be appreciated that the area between the outer boundary 112 of the intensified image field of view and the outer boundary 117 of the see-through image field of view affords an annular peripheral vision field of view. This peripheral vision field of view is often adequate, for example, to permit the viewer to see an instrument panel of an automobile or the like, by a simple movement of the eyes, when the intensified image field of view 111 is directed through the vehicle windshield. It will be understood, however, that when the image intensifier 60 is turned off, the entire see-through image field of view is transparent to approximately 50% of the incoming visible light from the viewed object.

Automatic light control assembly 55 insures that goggles 20 will be operative in sudden excessive lighting conditions, such as in the presence of flares or the like. As soon as an excessive lighting condition is sensed by the image intensifier 60, it sends a feedback signal to motor 58 for closing iris 54 by the necessary amount.

FIGS. 6-8 illustrate another embodiment of night vision goggles, generally designated by numeral 120, as are disclosed in U.S. Pat. Nos. 4,653,879. Goggles 120 are similar in many respects to goggles 20 and common parts bear the same reference numerals. Goggles 120 include a housing assembly 121 having left and right eye housings 122 and 123 which are fundamentally the same as the housings 22 and 23 described above, except that they have a slightly greater height, preferably about 110 mm. Each of the housing 122 and 123 has a large input window 130 which is substantially the same as the input windows 30 described above, and immediately therebelow a small input window 137. Windows 130 and 137 preferably overlap slightly along a truncation line 138.

Each of the housings 122 and 123 has an optical assembly 140, which differs in only a few respects from optical assembly 40 described above. More particularly, optical assembly 140 includes a mirror 145 immediately behind the input window 137 for reflecting all of the incoming light downwardly to an objective lens set 150, which is substantially the same as objective lens set 50 described above, except that its first element is a lens group 151. The optical path then proceeds through image intensifier 60 to a relay lens set 165 comprising a plurality of separated elements 166, 167 and 168. Relay lens set 175 serves the same function as relay lens group 65, above, i.e., to invert the image from image intensifier 60. The optical path then extends through an eyepiece lens set 170, which includes a lens group 171 between mirrors 68 and 73, and a plano-convex lens element 172. Immediately beneath lens element 172, and behind input window 130, is a prism set 141 which is substantially identical to prism set 41 except that it has no coating on surface 44 of the separating prism thereof.

Referring top FIGS. 7 and 8, it can be seen that the optical paths formed by optical assembly 140 is slightly different from that formed by optical assembly 40. More particularly, there is a straight-line, see-through path 300 along the viewing axis which passes through the input window 130, the prism set 141 and the diopter adjustment lens 75 to the viewer's eye. Both visible and infrared light passes along this path 300, but the infrared light is not visible to the viewer.

The full spectrum of visible and infrared light from the viewed object also enters input window 137 to a straight line portion 302 of an intensified light path 305, which is disposed substantially parallel to see-through path 300, but is spaced therefrom a predetermined distance, preferably about 20 mm. All of this light is reflected by mirror 145 into a folded portion 303 of the path 305, which includes legs 304, 306, 307, 308 and 309, all lying in a plane disposed substantially perpendicular to the see-through path 300. It will be noted that the objective lens set 150 and the eyepiece lens set 170 are, respectively, diagrammatically shown in the legs 306 and 308 of FIG. 8. In operation, the visible and infrared light in the intensified light path 305 is converted by the image intensifier 60 to P-20 light, which is reflected by prism set 141 into the see-through path 300 and to the eye of the user.

Except as indicated above, the operation of goggles 120 is exactly the same as for goggles 20. Housing assembly 121 is slightly larger than housing assembly 21, but optical assembly 140 is more efficient than optical assembly 40, since the full spectrum of light from the viewed object passes through the image intensifier 60. The slight separation of the see-through path 300 from the straight-line portion 302 of the intensified light path 305 may cause some parallax at close-up viewing, but the effect is very minimal.

The slightly larger housing assembly 121 weighs approximately 400 grams, resulting in a moment relative to the viewer's eye of approximately 850 g/cm.

As indicated previously, the foregoing describes embodiments of night vision goggles as described in prior U.S. Pat. No. 4,653,879, the complete disclosure of which is herein incorporated by reference. An objective lens system, relay lens system, and eyepiece lens system suitable for use in such goggles are described in prior U.S. Pat. No. 4,655,562, which is also incorporated herein by reference.

FIGS. 9A and 9B show improved night vision goggles 600 according to one embodiment of the present invention. Similar to the embodiment shown in FIGS. 6-8, goggles 600 provides a straight-line, see-through path for unintensified light along the viewing axis which passes through an input window 630 and a combining prism set 641 through a diopter adjustment lens 675 to the user's eye. Input window 630 has a greater surface area, and affords the user a somewhat greater peripheral field of view than input window 130 in the embodiment of FIGS. 6-8.

The full spectrum of visible and infrared light from a viewed object also enters input window 637 of the intensified light path. An objective lens set such as lens set 650 illustrated in FIG. 13 receives light entering input window 637, and transmits the light to the input of image intensifier tube 660 via a folded light path which includes a prism 657 or other image bending means as shown in FIG. 13 to direct the incoming light upwardly into the image intensifier tube 660 as indicated by the arrows in FIG. 13.

The optical assembly in the embodiment of FIGS. 9A and 9B is more compact and includes fewer components than that shown in FIGS. 6-8, however, the principles of operation of the assemblies are generally the same with each including two intersecting optical paths, a direct or unintensified light path to the user's eye lying along a straight line, and an intensified light path having a folded portion non-parallel to the direct path with an image intensifying means in the folded portion.

FIG. 9A also illustrates prisms 692 and 691 having reflecting surfaces 694 and 693, respectively, to receive intensified light from the image intensifier tube 660 and to perform the image bending function to direct the intensified light to combining prism set 641. The use of prisms as image bending means rather than mirrors as in the previous embodiments is well-known to those skilled in the art.

With particular reference to FIG. 9B, prism 692 is positioned above image intensifier tube 660, and its reflective surface 694 is oriented to direct the light from the image intensifier forwardly in the goggle housing 622 at an acute angle of, preferably, about 20° relative to a plane 621 perpendicular to both the axis 623 of the unintensified light path through input window 630 and to the axis 624 of the light path through input window 637 of the intensified light path. Prism 691 is positioned forwardly in the goggle housing and its reflective surface 693 is oriented to receive the light from prism 692 and to direct the light downwardly to combining prism set 641. By positioning the prisms in the housing with their reflecting surfaces angularly offset from one another in this manner, the optics in the intensified light path are simplified and more closely follow the shape of the user's face. This permits the goggles to be more compact and to be shaped to allow the user to also wear other equipment on his head, such as a helmet or an oxygen mask, without interference from the goggles. This is an important benefit inasmuch, as indicated previously, common users of such goggles are high performance aircraft pilots who often require such additional equipment.

As will be apparent to those skilled in the art, the 20° angular offset of the two reflective surfaces 694 and 693 of prisms 692 and 691, respectively, results in the intensified image being rotated by about 40°; and it is necessary to provide an image rotating means in the intensified light path to compensate for the image rotation caused by the offset so that the intensified image will be upright and in registration with the unintensified image when they are combined by combining prism 641 and directed to the user's eyes.

In the goggles of FIGS. 9A and 9B, this is preferably accomplished by incorporating a twisted fiber optic bundle, schematically illustrated at 666 in FIG. 9A, in the image intensifier 660 to rotate the image by 40° in the direction of the offset. The use of twisted fiber optics to correct the image rotation is preferred because the precise amount of correction needed can be achieved in a simple manner while retaining the desired compactness of the goggles' optical system. Also, because only a 40° fiber optic twist is required for image correction in the goggles of the present invention, the optical fiber bundle 666 does not have to be as long as in prior twisted fiber optics systems, which, as described previously, are sometimes used to rotate an inverted image by 180°.

As also indicated previously, however, the use of twisted fiber optics in the image intensifier introduces distortion in the resultant intensified image which can be as much as several hundred microns. Such distortion is undesirable as it can interfere with the user's depth perception and can cause headaches when the goggles are worn for an extended period of time.

In accordance with the present invention, the distortion that is normally introduced in an image by twisted fiber optics is significantly reduced by forming optical fiber bundle 666 as a composite optical fiber bundle which comprises a first, straight optical fiber bundle section 667 and a second, twisted optical fiber bundle section 668 which abut one another end-to-end at a curvilinear interface 669 which is designed to substantially reduce the distortion normally introduced by the twisted fiber optics. The manner by which this is accomplished can be best understood with reference to FIGS. 10A, 10B and 10C.

Figure 10A:
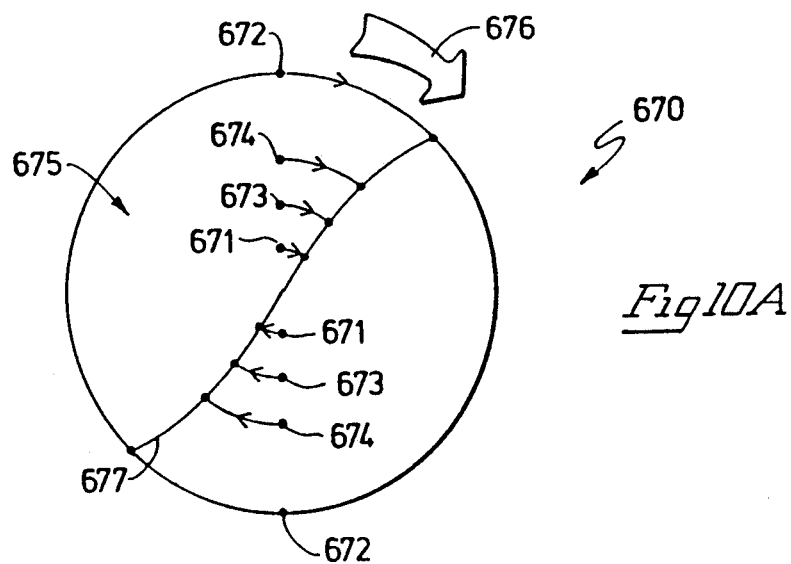
FIGS. 10A, 10B and 10C are provided to assist in explaining the manner by which distortion of the intensified image is corrected in accordance with the present invention.

FIG. 10A schematically illustrates an end, for example, the bottom end 675, of a twisted fiber optic bundle 670 as may be incorporated in an image intensifier tube. Bundle 670, of course, consists of a large number of individual optical fibers to transmit bits of light from the photocathode input of the image intensifier to the phosphor output thereof. Some of the fibers, for example, fibers 671, are relatively close to the central axis of the bundle; while other fibers, for example, fibers 672, are adjacent the periphery of the bundle. Yet other fibers such as fibers 673 and 674 are located at intermediate positions in the bundle between the center and periphery of the bundle.

In order to provide a twisted fiber optic bundle, a bundle of straight fibers is heated and then physically twisted by the desired amount using known techniques. In practice, however, not all of the fibers in the bundle are twisted by the same amount. In actuality, the outer fibers, such as fibers 672, will be twisted to a greater extent than more centrally located fibers such as fibers 671 due to sliding of the fibers against one another during the twisting operation. For example, to obtain an optical fiber bundle having a 40° twist in the direction indicated by arrow 676, the outer fibers in the bundle will be twisted such that one of the ends thereof are moved or displaced along an arc of more than 40°, for example, 42°, relative to the other ends thereof; while the inner fibers in the bundle will be twisted such that one of the ends thereof are moved or displaced along an arc of less than 40°, for example, 38°, relative to the opposite ends thereof. The ends of fibers at intermediate locations in the bundle will be moved or displaced along arcs of intermediate length. Thus, in an optical fiber bundle having a 40° twist, that amount is only an average of the amount by which each individual fiber is twisted; and it is the difference by which each fiber is twisted that results in distortion in the intensified image.

The difference in the lengths of the arcs that the ends of the individual optical fibers are displaced when the bundle is twisted, is illustrated by curve 677 in FIG. 10A which is generally referred to as an S-curve. Stated another way, if the input surface of a twisted optical fiber bundle were placed on a straight line, the line at the output of the bundle would be rotated by 40° by the twist, and additionally be distorted to the general appearance of the S-curve 677.

Figure 10B:
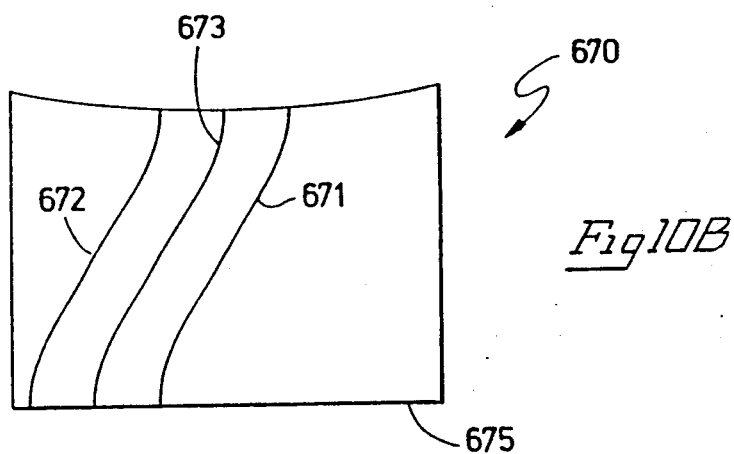

FIG. 10B is a schematic side view of twisted optical fiber bundle 670 illustrating several twisted optical fibers 671, 672, 673 therein. As shown, the fibers are twisted in such a manner that the ends thereof are substantially straight and parallel to one another, with the twist being between the straight portions.

Figure 10C:
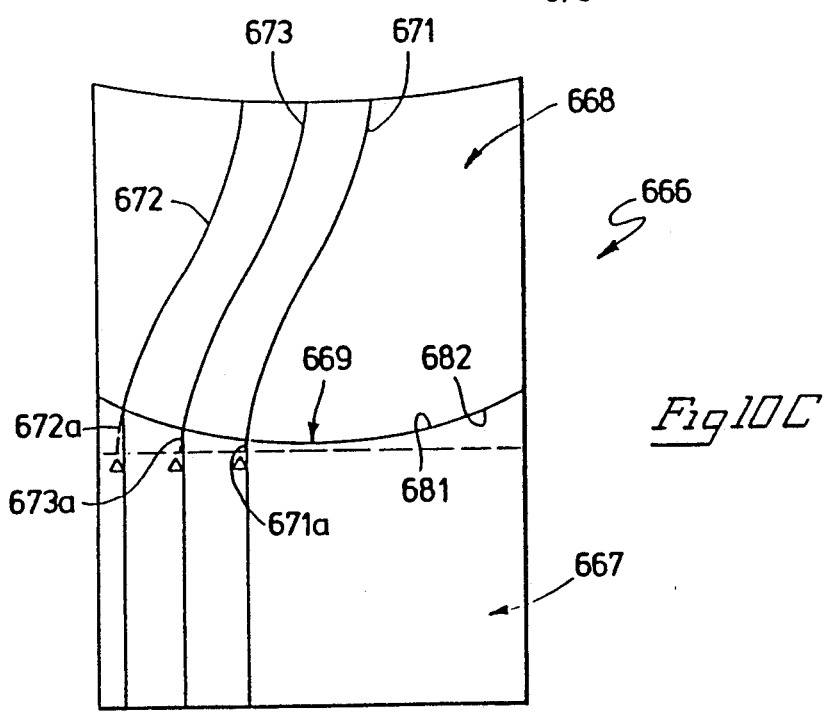

FIG. 10C schematically illustrates twisted optical fiber bundle 666 incorporating the distortion correction means of the present invention. Bundle 666 includes a first, straight optical fiber bundle section 667, and a second, twisted optical fiber bundle section 668 joined together end-to-end at curvilinear interface 669.

As shown in FIG. 10C, curvilinear interface 669 is defined by complementary end surfaces 681 and 682 on the first and second bundle sections, respectively, which are preferably of concave and convex spherical shape, respectively. Convex end surface 682 on twisted bundle section 668 is formed by twisting a bundle of straight optical fibers such as bundle 670, and then removing a portion of the end surface 675 thereof to form curved end surface 682. Concave end surface 681 on fiber bundle section 667 is formed in a similar manner from a bundle of straight fibers.

As illustrated by the dotted lines in FIG. 10C, providing convex curved surface 682 on bundle section 668 results in portions of the ends of the individual twisted optical fibers in bundle 668 being removed; and the length of the end portion removed from each fiber increases gradually from the center of the bundle to the outer periphery thereof. For fibers such as fibers 671 near the center of the bundle, only a short length 671a of the ends of the fibers are removed; while for fibers such as fiber 672 adjacent the periphery of the bundle, longer lengths 672a of the ends of the fibers are removed.

Removing portions of the ends of the individual twisted fibers in bundle section 668 results in a shortening of the length of the arcs that the ends of each fiber are displaced relative to the opposite ends thereof. Furthermore, the curvilinear surface results in the arcs along which the ends of the fibers are displaced being shortened to a greater degree for fibers adjacent the periphery of the bundle than for fibers closer to the center of the bundle. The amount by which the arc is shortened for each fiber is indicated by the symbol Δ in FIG. 10C. As a result, curvilinear surface 682, in effect, results in each fiber in bundle section 668 having a substantially equal amount of twist, thus substantially eliminating the S-curve 677 and substantially eliminating the distortion normally introduced by the non-uniform twisting of the fibers in the bundle. To provide a substantially distortion-free 40° twist, the initial fiber optic twist should be such as to twist the outer fibers in bundle section 668 by about 44°, such that centrally positioned fibers will be twisted by about 40°. When convex end surface 682 is formed on bundle section 668, all the fibers in the bundle section will have a substantially equal amount of twist of about 40°.

Curved end surface 681 of straight optical fiber bundle section 667 is made complementary to surface 682, and the surfaces are preferably bonded together by a suitable optical cement to define interface 669. The two fiber bundle sections 667 and 668 thus form a single composite twisted optical fiber bundle 666 in which the twisted portions of the composite optical fibers are somewhat shorter and the straight portions of the composite fibers are somewhat longer as the fibers are positioned closer to the periphery of the bundle, with the result being that each of the composite fibers rotates its portion of the light transmitted by the composite bundle by substantially the same amount thus substantially eliminating distortion in the resultant rotated image.

The curvature of interface 669 must be precisely matched to the particular S-curve being compensated for to properly correct the distortion in the resultant image. In the presently preferred embodiment wherein the diameter of the bundle is about 18 mm, the curvature of the interface has a spherical curvature of 25.4 microns to compensate for the distortion introduced by a 40° twist in the bundle. For different sized bundles or for different amounts of twist, interface 669 will be formed to have different curvatures.

It is preferred that interface 669 be of spherical shape as such a shape is relatively easy to provide. Such a surface having a curvature of 25.4 microns as indicated above provides a reduction in the gross distortion introduced by the twisted fiber optics from about 200-300 microns to about 50 microns which is an acceptable amount of distortion. By use of a proper aspherically curved interface, it may be possible to reduce distortion even further, however, the spherical curvature is fully satisfactory in most applications.

It should also be understood that although the twisted optical fiber bundle section of the composite optical fiber bundle is shown as being adjacent the output of the image intensifier, the twisted section can be anywhere in the optical fiber path.

FIGS. 11A and 11B illustrate a further embodiment of the present invention. In general, the goggles 500 illustrated in FIGS. 11A and 11B are similar in structure and function to the goggles 600 in FIGS. 9A and 9B described above. A folded light path is provided which includes an input window 637, an image intensifier 660, corner prisms 692 and 691, and combining prism set 641 (not shown).

As illustrated in FIG. 11A, a further prism 690 is provided adjacent image bending prism 692. In the configuration shown, the optical path from prism 692 to prism 691, through a portion of the ocular optics, has two inputs. The first, primary input, comprises the intensified image described above which includes the output of image intensifier 660. The second input is provided from prism 690 to prism 692. Thus, prism 690 provides a path for a secondary image input from a secondary image source 550 to the folded optical path which may be used for injecting indicia or other secondary images into the intensified light path to be passed through the eyepiece optics to the user.

In the embodiment illustrated, the secondary image source 550 comprises a light emitting diode image display 551 comprising an addressable array of miniature LED elements which is mounted to the goggles.

Drive electronics 552 are provided to address and control the individual LED elements, thereby generating a bright symbology image which may be used for numerous types of indicia input. For example, a HUD-type symbology display showing aircraft attitude or performance may be generated by the miniature graphic display.

The drive electronics 552 receive input signals via a connecting link 553, such as an electrical cable, fiber optic communication link or other known structure. In a preferred embodiment, connecting link 553 is provided with plugs (not shown) which provide quick connection and disconnection of the goggles to the electronics of an aircraft or other vehicle, both during normal use and during emergency situations such as during ejection from an aircraft.

Other means for presenting secondary images to the secondary image input to the folded optical path may also be used. For example, a secondary image may be conducted by a multi-fiber optical cable from a remote image display, and presented to an input plane at the secondary image input of the goggles. Other imaging devices may also be used, including liquid crystal arrays (preferably with suitable back lighting) or CRT displays. Optical fibers could also be used to conduct passive visual images to the alternate input.

To maintain the desired brightness in the primary intensified image optical path, it is preferable to provide prism 692 with a substantially reflecting surface at the junction between prisms 692 and 690 (i.e., at surface 694). In this manner, the majority of the light output by image intensifier 660 will be reflected through the eyepiece optics, and received by the user. For example, prism 692 may exhibit reflectance characteristics of approximately 90% for light having wavelengths within the range of the image intensifier output.

Because of the high reflectance of surface 694, however, the secondary image source should have sufficient brightness to provide a suitably intense image to the user through the low transmittance surface 694. This intensity may be maximized by utilizing a dichroic reflecting coating on surface 694 which is reflective to the wavelengths of the image intensifier 660, while significantly transmissive to the wavelengths of the secondary image source 550.

As shown in FIG. 11A, secondary image inputs may be provided in each of the housings 522, 523. In this manner, secondary images may be provided to both the left and right eyes of the user. These secondary images may be identical, or may differ. For example, a FLIR image may be presented to the right eye, while a HUD symbology display is presented to the left eye. Alternatively, stereo images may be provided to give a three-dimensional effect.

Caps (not illustrated) may be provided to seal the light path when secondary image sources are not attached to the goggles.

It is to be understood that the types of secondary image sources that can be provided by the present invention is unlimited, and the present invention is also not limited to any particular type of secondary image.

As best shown in FIG. 11B, secondary image source 550 is preferably attached to the housing of goggles 500 so as to be inclined forwardly such that the secondary image is substantially aligned with the axis 620 (see FIG. 9B) of the intensified optical path portion from prism 692 to prism 691. The secondary image will be rotated as a result of the reflection of the image off of reflective surface 693 of prism 691 and, therefore, the image from the secondary image source should be oriented to compensate for the rotation.

Secondary image source 550 injects a secondary image into the intensified light path after the primary image has been intensified by image intensifier 660. As a result, the secondary imager can be used even when the image intensifier is turned off so that a secondary image can be presented to the user whenever desired. In addition, the secondary image source is mounted to the goggles somewhat forwardly thereon and at the side of the goggle housing at a position such that it will normally not interfere with a helmet or other equipment worn by the user. In certain prior systems, a secondary image was injected into goggles at the eyepiece directly in front of the user's eye which interfered with his field of view. Also, with the present invention, only one additional prism 690 is needed to inject the secondary image into the system. This maintains the compactness of the system optics without significantly increasing the weight of the goggles.

FIGS. 11A and 11B illustrate yet a further aspect of the present invention. In particular, goggles 500 provide the user with a binocular field of view of approximately 114°. Inasmuch as the normal binocular field of view of a person is only about 120°, wearing the goggles of the present invention does not significantly reduce the user's binocular field of view. The goggles, and, in particular, various structures thereon, do, however, restrict the user's peripheral vision or monocular field of view. Specifically, most people, by moving their eyes from side to side, can see, or at least be aware of, nearly a full 180° from horizon to horizon. With the goggles of the present invention, however, total field of view is limited to about 120° by protuberances and other obstructions on the goggles. It is desirable to enhance the user's peripheral field of view as much as possible, and goggles 550 include peripheral imaging structure 540 for providing an enlarged peripheral field of view to the user.

As shown in FIGS. 11A and 11B, input window 530 is provided with a side-looking window section 531 which substantially faces the outer side of housing 522 in order to receive light reaching the goggles from strong angular positions relative to the front surface of window 530. Section 531 preferably comprises a negative cylindrical lens which is adapted to compress the light passing therethrough into a narrower beam, i.e., beam 541. Light beam 541 then impinges upon a first, positive power reflector element 533, which may comprise a convex mirror but preferably comprises a flat holographic reflector having a positive power. Reflector 533 reexpands the compressed beam and directs the beam to second, negative reflector element 535 which may comprise a negative power mirror, but, preferably, comprises a holographic reflector having negative power. Negative reflector 535 magnifies and collimates the light so that it will be refocussed at infinity and be identical to the light that entered into window section 531, and directs the light to the user's eye.

Peripheral imaging structure 540 can provide the user with a peripheral field of view of 160° or more notwithstanding obstructions on the goggles, on a helmet or on other structures being worn by the user.

Preferably, first reflector 533 is positioned as close as possible to the center of the user's field of view to minimize the angle at which it must be oriented to reflect the light from input window section 531 to second reflector 535 so as to, in turn, minimize the extent to which the user's direct vision is obstructed by this component. By using a flat, holographic reflector rather than a curved mirror, obstruction of the user's direct vision is even further reduced.

In operation, light approaching the goggles from peripheral locations will be received by window section 531, compressed and transmitted along path 532 to the first, positive reflector 533. The beam is expanded by positive reflector 533 and reflected along path 534 to the second, negative reflector 535 which magnifies and recollimates the beam and directs it to the eye along path 536. It will be noted that path 536 is substantially parallel to the original incident path of the light, such that the peripheral image will be presented to the user with minimal distortion as compared to fish-eye imaging systems which provide a substantially distorted image. By properly positioning imaging structure 540, peripheral vision at angles approaching 180° may be provided to the user (by including the imaging structure on both housings 522 and 523).

By providing the configuration as described, a system is provided having a peripheral vision light path that supplements the direct vision and the limited peripheral vision normally available through window 530. The additional structure occupies little space and adds little weight to the goggles.

For convenience, one or both of the holographic reflectors can be supported within the goggles within composite prism members. Specifically, the reflector can be applied to a surface of a first prism element, and a second prism element bonded to the surface of the first element to provide an embedded holographic reflector within the composite prism.

FIGS. 12A and 12B illustrate yet a further embodiment of the present invention. In this embodiment, a single image intensifier tube 460 is provided in one of the goggle housings, e.g., housing 422. Housing 422 also includes an input window 437 which admits light to the objective optics for presentation to the input of the image intensifier tube 460, in the manner previously described.

Each of the housings 422, 423 are preferably provided with straight-through optical paths including input windows 430, again as discussed in connection with previous embodiments to provide binocular unintensified vision. However, the embodiment shown in FIGS. 12A and 12B provides for distribution of the output of a single image intensifier 460 to both the right and left eye of the user, by means of an optical path in bridge 424 to provide the user with bi-ocular intensified vision. Thus, the image intensifier output is reflected by image bending means 492 through a portion of the housing 422 folded optical path to reflecting prism 491, where a portion of the light is reflected down toward the combiner prism for presentation to the eyepiece optics and the user's left eye.

However, surface 495 of prism 491 is only partially silvered, such that a portion of the light (preferably about 50 percent) is transmitted through surface 495 and into the bridge optics, whose function is to transport the image across the bridge and present it to the combining prism set 441 in the straight-through optical path of housing 423 for presentation to the user's right eye. The bridge optics in the preferred embodiment shown include prism 498 to permit a bend in the bridge for clearance of the user's face, image transmitting optics 497, and a reflector 496 to reflect the image to the combining prism set 441 in housing 423. In the embodiment shown, the axes of the crossing portions of the folded light path are at 26° angles, and the image intensifier is accordingly provided with 52° fiber optic twist to compensate for the rotated image.

Because only a single image intensifier is used in the embodiment of FIGS. 12A and 12B, the resulting goggles 400 may have smaller dimensions and weight than the embodiments previously described. For example, the power supply 480 and batteries 481 may be housed in the housing 423, while the image intensifier is contained in housing 422, in contrast with previous embodiments wherein each housing contained both an image intensifier and an associated power supply and batteries. Larger batteries may therefore be housed, without undue compromise in weight or size, resulting in a longer duration power supply for the goggles. Finally, as shown in FIGS. 12A and 12B, secondary imager 550 may be provided, along with secondary image input means 490.

I claim:

1. Night vision goggles apparatus comprising light input means (430, 437, 530, 630, 637) for receiving incoming light from a viewed object and for directing the light along first and second intersecting optical paths to a user, said second optical path including a folded portion which is non-parallel to the first optical path, and image intensifying means (460, 660) in the folded portion for converting the light therein to an intensified visible light; and combining means (441, 641) at the intersection of said first and second optical paths for combining the light in said first path with the intensified light in said second path and for directing the combined light to the user, characterized in that said second optical path includes optical components (491, 492, 691, 692) which are angularly offset at an acute angle so as to cause a rotation of said intensified light relative to said incoming light, and wherein said apparatus further includes light rotating means (666) in the second optical path for rotating the light in said second optical path by an amount necessary to compensate for the rotation of said intensified light caused by said angularly offset optical components (491, 492, 691, 692).

2. The night vision goggles apparatus of claim 1 characterized in that said angularly offset optical components (491, 492, 691, 692) include first and second reflecting surfaces (693, 694) which are offset at an acute angle from one another.

3. The night vision goggles apparatus of claim 2 characterized in that said first and second reflecting surfaces (693, 694) comprise first and second prism surfaces (693, 694).

4. The night vision goggles apparatus of claim 2 characterized in that said first and second reflecting surfaces (693, 694) are angularly offset at approximately 20° and wherein said light rotating means (666) rotates said light by approximately 40° to correct for the rotation of said intensified light caused by reflection of said intensified light by said first and second reflecting surfaces (693, 694).

5. The night vision goggles apparatus of claim 1 characterized in that said light rotating means (666) comprises a twisted fiber optic bundle (666) in said light intensifying means (460, 660), said twisted fiber optic bundle (666) comprising a first fiber optic bundle section (667) and a second, twisted fiber optic bundle section (668) which abut one another end to end and define a curvilinear interface (669) therebetween for reducing image distortion normally caused by rotation of light by a twisted fiber optic bundle.

6. The night vision goggles apparatus of claim 5 characterized in that said first fiber optic bundle section (667) comprises a straight fiber optic bundle section (667).

7. Night vision goggles apparatus comprising light input means (430, 437, 530, 630, 637) for receiving incoming light from a viewed object and for directing the light along first and second intersecting optical paths to a user, said second optical path including a folded portion which is non-parallel to the first optical path, and image intensifying means (460, 660) in the folded portion for converting the light therein to an intensified visible light; and combining means (441, 661) at the intersection of said first and second optical paths for combining the light in said first path with the intensified light in said second path and for directing the combined light to the user, characterized in that said second optical path includes optical components (491, 492, 691, 692) which are angularly oriented so as to cause a rotation of said intensified light relative to said incoming light, and wherein said apparatus further includes a twisted fiber optic bundle (666) in said light intensifying means (460, 660) for rotating the light in said second optical path to correct for the rotation of said intensified light caused by said angularly oriented optical components (491, 492, 691, 692), said twisted fiber optic bundle (666) comprising a first, straight fiber optic bundle section (667) having a concave end surface (681) and a second, twisted fiber optic bundle section (668) having a convex end surface (682), said concave end surface (681) of said first, straight fiber optic bundle section (667) abutting said convex end surface (682) of said second twisted fiber optic bundle section (668) to define a curvilinear interface (669) therebetween for reducing image distortion normally caused by rotation of light by a twisted fiber optic bundle.

8. The night vision goggles apparatus of claim 7 characterized in that said curvilinear interface (669) comprises a spherical interface (669).

9. The night vision goggles apparatus of claim 7 characterized in that said first (667) and second (668) fiber optic bundle sections are cemented together at said interface (669) by an optical cement.

10. The night vision goggles apparatus of claim 8 characterized in that said twisted fiber optic bundle (666) has a diameter of about 18 mm and is twisted by about 40°, and wherein said spherical interface (669) has a radius of curvature of about 25.4 microns.

11. Night vision apparatus comprising light input means (430, 437, 530, 637) for receiving incoming light from a viewed object and for directing the light along first and second intersecting optical paths to a user, said first optical path comprising an unintensified light path and said second optical path comprising an intensified light path, said intensified light path including image intensifying means (460, 660) for converting the light therein to an intensified visible light; and combining means (441, 641) at the intersection of said first and second optical paths for combining the unintensified light in said first path with the intensified light in said second path and for directing the combined light to the user, characterized in that said apparatus further includes a secondary image input means (490, 690) for receiving a secondary image and for injecting said secondary image into said intensified light path at a position between said image intensifying means (460, 660) and said combining means (441, 641).

12. The night vision apparatus of claim 11 characterized in that said intensified light path includes means (492, 692) for defining a surface (694) for reflecting intensified light from said light intensifying means (460, 660) and for transmitting said secondary image from said secondary image input means (490, 690).

13. The night vision apparatus of claim 12 characterized in that said surface defining means (492, 692) comprises a first prism (492, 692), and wherein said secondary image input means (490, 690) comprises a second prism (490, 690) adjacent said first prism (492, 692).

14. The night vision apparatus of claim 11 wherein said apparatus includes first and second housings (422, 423, 522, 523) for covering the eyes of the user, and characterized in that said apparatus further includes a secondary image source (550) mounted to at least one of said housings (422, 423, 522, 523) for directing said secondary image to said secondary image input means (490, 690).

15. The night vision apparatus of claim 14 characterized in that said secondary image source (550) is mounted to said at least one housing (422, 423, 522, 523) at the outer side of the housing (422, 423, 522, 523).

16. The night vision apparatus of claim 14 characterized in that said secondary image source (550) comprises an LED image display (551).

17. The night vision apparatus of claim 14 characterized in that a secondary image source (550) is mounted to each of said first and second housings (522, (523) for presenting first and second secondary images to the user.

18. The night vision apparatus of claim 17 characterized in that said first and second secondary images comprise different images.

19. The night vision apparatus of claim 14 characterized in that said secondary image source (550) includes means (553) for coupling said secondary image source (550) to external electronics.

20. Night vision goggles apparatus comprising first and second goggle housings (422, 423) for the first and second eyes, respectively, of a user, each of said housings (422, 423) including first light input means (430) for receiving light from a viewed object and for directing unintensified light along a first optical path to the user, characterized in that said first housing (422) further includes second light input means (437) for receiving light from a viewed object and for directing the light along a second optical path which intersects the first optical path in both said first and second housings (422, 423), said second optical path including image intensifying means (460) for converting the light therein to a visible intensified light;

means (491) in said first housing (422) for dividing said intensified light into first and second intensified light portions;

first combining means (441) in said first housing (422) for combining said first portion of the intensified light with the unintensified light in the first optical path in said first housing (422) and for directing the combined light to the first eye of the user; and second combining means (441) in said second housing (423) for combining the second portion of the intensified light with the unintensified light in the first optical path of the second housing (423) and for directing the combined light to the second eye of the user (495);

said dividing means (491) including means for directing said first portion of said intensified light to said first combining means (441) and the second portion of said intensified light to said second combining means (441).

21. The night vision goggles apparatus of claim 20 characterized in that said second optical path includes optical means (497) in a bridge (424) connecting said first and second housings (422, 423) for transmitting said second portion of said intensified light to said second housing (423).

22. The night vision goggles apparatus of claim 21 characterized in that said dividing means (491) comprises a prism (491) having a surface (495) for reflecting said first portion of said intensified light and for transmitting said second portion of said intensified light.

23. The night vision goggles apparatus of claim 21 characterized in that a power supply (480) for said image intensifying means (460) is supported in said second housing (423).

24. Night vision goggles apparatus comprising forward-facing light input means (530, 637) for receiving incoming light from a viewed object and for directing the light along first and second intersecting optical paths to a user, said second optical path including image intensifying means (660) for converting the light therein to an intensified visible light; and combining means (641) at the intersection of said first and second optical paths for combining the light in said first path with the intensified light in said second path and for directing the combined light to the user, characterized in that said apparatus further includes peripheral imaging means (540) for directing light from peripheral positions to the user, the peripheral imaging means (540) including side-facing light input means (531) for receiving light from peripheral positions, and reflecting means (533, 535) for reflecting said light received by said side-facing light input means (531) to the user.

25. The night vision goggles apparatus of claim 24 characterized in that said side-facing light input means (531) comprises a negative lens (531) for compressing said light received from peripheral positions into a compressed light beam (532).

26. The night vision goggles apparatus of claim 25 characterized in that said reflecting means (533, 535) comprises a first, positive power reflector (533) for expanding said compressed light beam (532), and a second, negative power reflector (535) for collimating said expanded light beam (534) and for directing said collimated light beam (536) to the user.

27. The night vision goggles apparatus of claim 26 characterized in that at least said first reflector (533) comprises a holographic reflector (533).

28. The night vision goggles apparatus of claim 27 characterized in that said first reflector (533) is positioned in front of the user's eye close to the center of the user's field of view.

29. The night vision goggles apparatus of claim 24 wherein said apparatus includes first and second goggle housings (522, 523) for the first and second eyes, respectively, of said user, characterized in that each of said housings (522, 523) includes a peripheral imaging means (540) for providing the user with a peripheral field of view of at least 160°.

30. Optical imaging apparatus which includes means for defining an optical path having an input (437, 637) for receiving light from an object, and an output (675) for providing an output image of said object, a twisted fiber optic bundle (666) in said light path for rotating said output image, characterized in that said twisted fiber optic bundle (666) comprises a first fiber optic bundle section (667) and a second, twisted fiber optic bundle section (668) which abut one another end to end and define a curvilinear interface (669) therebetween for reducing image distortion normally caused by rotation of light by a twisted fiber optic bundle.

31. Optical imaging apparatus which includes means for defining an optical path having an input (437, 637) for receiving light from an object, and an output (675) for providing an output image of said object, a twisted fiber optic bundle (666) in said light path for rotating said output image, characterized in that said twisted fiber optic bundle (666) comprises a first, straight fiber optic bundle section (667) and a second, twisted fiber optic bundle section (668) which abut one another end to end and define a curvilinear interface (669) therebetween for reducing image distortion normally caused by rotation of light by a twisted fiber optic bundle, said second, twisted fiber optic bundle section (668) including a convex end surface (682) and said first, straight fiber optic bundle section (667) including a concave end surface (681) which abut one another to define said curvilinear interface (669).

32. The apparatus of claim 30 characterized in that said first and second fiber optic bundle sections (667, 668) are cemented together at said interface (669) by an optical cement.

33. Optical imaging apparatus which includes means for defining an optical path having an input (437, 637) for receiving light from an object, and an output (675) for providing an output image of said object, a twisted fiber optic bundle (666) in said light path for rotating said output image, characterized in that said twisted fiber optic bundle (666) is incorporated within an image intensifying means (460, 660) and comprises a first fiber optic bundle section (667) and a second, twisted fiber optic bundle section (668) which abut one another end to end and define a curvilinear interface (669) therebetween for reducing image distortion normally caused by rotation of light by a twisted fiber optic bundle.

34. Night vision goggles apparatus comprising first and second goggle housings (422, 423) for the first and second eyes, respectively, of a user, characterized in that said first housing (422) includes light input means (437) for receiving light from a viewed object and for directing the light along an optical path which includes image intensifying means (460) for converting the light therein to a visible intensified light;

means (491) in said first housing (422) for dividing said intensified light into first and second intensified light portions;

first means (441) in said first housing (422) for directing the first portion of the intensified light to the first eye of the user; and second means (441) in said second housing (423) for directing the second portion of the intensified light to the second eye of the user;

said dividing means (491) including means (495) for directing said first portion of the intensified light to said first means (441) and the second portion of said intensified light to said second means (441), said optical path including optical means (497) in a bridge (424) connecting said first and second housings (422, 423) for transmitting said second portion of said intensified light to said second housing (423).

35. The night vision goggles apparatus of claim 34 characterized in that said dividing means (491) comprises a prism (491) having a surface (495) for reflecting said first portion of said intensified light and for transmitting said second portion of said intensified light.

36. The night vision goggles apparatus of claim 34 characterized in that a power supply (480) for said image intensifying means (460) is supported in said second housing (423).

* * * * *